US009450960B1

(12) United States Patent
McCorkendale et al.

(10) Patent No.: US 9,450,960 B1
(45) Date of Patent: Sep. 20, 2016

(54) VIRTUAL MACHINE FILE SYSTEM RESTRICTION SYSTEM AND METHOD

(75) Inventors: Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1548 days.

(21) Appl. No.: 12/265,157

(22) Filed: Nov. 5, 2008

(51) Int. Cl.
*H04L 29/06* (2006.01)

(52) U.S. Cl.
CPC .................................... *H04L 63/10* (2013.01)

(58) Field of Classification Search
CPC ...... G06F 21/52; G06F 21/56; G06F 21/566; G06F 2221/2149; H04L 63/10
USPC ............................................................ 726/3
See application file for complete search history.

(56) References Cited

U.S. PATENT DOCUMENTS

| | | | |
|---|---|---|---|
| 5,361,375 A | 11/1994 | Ogi | |
| 6,075,938 A | 6/2000 | Bugnion et al. | |
| 7,398,553 B1 * | 7/2008 | Li | 726/22 |
| 7,509,680 B1 * | 3/2009 | Sallam | 726/24 |
| 7,725,941 B1 * | 5/2010 | Pavlyushchik | 726/24 |
| 7,765,400 B2 * | 7/2010 | Costea et al. | 713/165 |
| 7,765,544 B2 * | 7/2010 | Brickell et al. | 718/1 |
| 7,844,744 B2 * | 11/2010 | Abercrombie et al. | 709/250 |
| 2003/0088680 A1 | 5/2003 | Nachenberg et al. | |
| 2006/0021029 A1 | 1/2006 | Brickell et al. | |
| 2006/0136720 A1 | 6/2006 | Armstrong et al. | |
| 2006/0206658 A1 | 9/2006 | Hendel et al. | |
| 2006/0236392 A1 * | 10/2006 | Thomas et al. | 726/23 |
| 2007/0006304 A1 * | 1/2007 | Kramer et al. | 726/22 |
| 2007/0050767 A1 * | 3/2007 | Grobman et al. | 718/1 |
| 2007/0089111 A1 | 4/2007 | Robinson et al. | |
| 2007/0174897 A1 | 7/2007 | Rothman et al. | |
| 2007/0198243 A1 | 8/2007 | Leis et al. | |
| 2007/0288228 A1 | 12/2007 | Taillefer et al. | |
| 2008/0027891 A1 * | 1/2008 | Repasi et al. | 706/52 |
| 2008/0127346 A1 * | 5/2008 | Oh et al. | 726/23 |
| 2008/0184218 A1 * | 7/2008 | Largman et al. | 717/168 |
| 2009/0276774 A1 * | 11/2009 | Kinoshita | 718/1 |

OTHER PUBLICATIONS

"BIOS", p. 1 [online]. Retrieved on Feb. 18, 2008 from the Internet: <URL:http://en.wikipedia.org/wiki/BIOS>. No author provided.
"Booting", pp. 1-8 [online]. Retrieved on Mar. 12, 2008 from the Internet: <URL:http://en.wikipedia.org/wiki/Booting>. No author provided.
"Device Node", pp. 1-3 [online]. Retrieved on Mar. 12, 2008 from the Internet: <URL:http://en.wikipedia.org/wiki/Block_device>. No author provided.

(Continued)

*Primary Examiner* — William Goodchild
(74) *Attorney, Agent, or Firm* — Wilmer Cutler Pickering Hale and Dorr LLP

(57) ABSTRACT

A method includes creating a virtual machine including a remote file system, a file system service, and a security application. Access to the remote file system is restricted with the security application upon an unknown malicious code outbreak. The more that is known about the threat, the more precise are the restrictions placed upon the file system thus reducing the impact on users of the file system to an absolute minimum.

6 Claims, 7 Drawing Sheets

(56) References Cited

OTHER PUBLICATIONS

"File System", pp. 1-9 [online]. Retrieved on Mar. 12, 2008 from the Internet: <URL:http://en.wikipedia.org/wiki/File_system>. No author provided.

"Hypervisor", pp. 1-5 [online]. Retrieved on Mar. 12, 2008 from the Internet: <URL:http://en.wikipedia.org/wiki/Hypervisor>. No author provided.

"Network booting", p. 1 [online]. Retrieved on Mar. 12, 2008 from the Internet: <URL:http://en.wikipedia.org/wiki/Network_booting>. No author provided.

"Preboot Execution Environment", pp. 1-4 [online]. Retrieved on Mar. 12, 2008 from the Internet: <URL:http://en.wikipedia.org/wiki/Preboot_Execution_Environment>. No author provided.

"Preboot Execution Environment (PXE) Specification", Version 2.1, Sep. 20, 1999, Intel Corporation, pp. 1-101. No author provided.

"Single-instance storage", pp. 1-2 [online]. Retrieved on Mar. 18, 2008 from the Internet: <URL:http://en.wikipediea.org/wiki/Single_instance_storage>. No author provided.

"Uniform Naming Convention", p. 1 [online]. Retrieved on Feb. 18, 2008 from the Internet: <URL:http://en.wikipedia.org/wiki/Path_%28computing%29>. No author provided.

"Virtual machine", pp. 1-7 [online]. Retrieved on Mar. 12, 2008 from the Internet: <URL:http://en.wikipedia.org/wiki/Virtual_machine>. No author provided.

Sobel et al., "Virtual Machine File System Content Protection System and Method", U.S. Appl. No. 12/059,622, filed Mar. 31, 2008.

Sobel et al., "Simulating PXE Booting for Virtualized Machines", U.S. Appl. No. 12/059,817, filed Mar. 31, 2008.

* cited by examiner

VIRTUAL MACHINE FILE SYSTEM RESTRICTION SYSTEM AND METHOD

BACKGROUND

Field of the Invention

The present invention relates to computer system security. More particularly, the present invention relates to a system and method of providing security to virtual machines.

Description of the Related Art

A virtual machine (VM) is a software implementation of a computer that executes programs like a real physical computer. A system virtual machine provides a complete system platform which supports the execution of a complete operating system such as a Windows® operating system.

It is not uncommon to have several virtual machines running on a single real physical computer. Each of these virtual machines typically includes a security service, e.g., an antivirus scanner, as does any real computer. However, providing a separate security service for each virtual machine is overhead intensive.

Malicious code often resides in executable computer code and is activated when the computer code is executed. Malicious code can spread rapidly throughout computer networks during "outbreaks" of the malicious code. Unknown malicious code can contaminate hundreds of thousands of computers worldwide in a few hours or days and cause enormous damage.

Often, reactive technologies, e.g., anti-virus scanning software, are used to scan computer files to detect malicious code that is known and has been analyzed. The reactive anti-virus software often fails to catch or prevent unknown malicious code.

SUMMARY OF THE INVENTION

In accordance with one embodiment, a method includes creating a virtual machine including a remote file system, a file system service, and a security application. Access to the remote file system is restricted with the security application upon an unknown malicious code outbreak.

The security application is insinuated at the chokepoint provided by the virtual machine to changes to the file system. This allows the security application to inspect changes to the file system, e.g., access of files on the file system as well as writing of files to the file system, from the shared and controlled environment of the virtual machine. The protection of the file system provided by the security application is absolute. Accordingly, the security application facilitates a simple, convenient, yet extremely secure solution for restricting access to files and writing of files to the file system.

The security application enables reliable and precise protection of the file system from an emerging threat during the window between the release of the threat and the delivery of the virus signature for the threat. More particularly, the security application restricts access to and writing of files to the file system having attributes matching characteristics of the threat. The more that is known about the threat, the more precise are the restrictions placed upon the file system thus reducing the impact on users of the file system to an absolute minimum.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
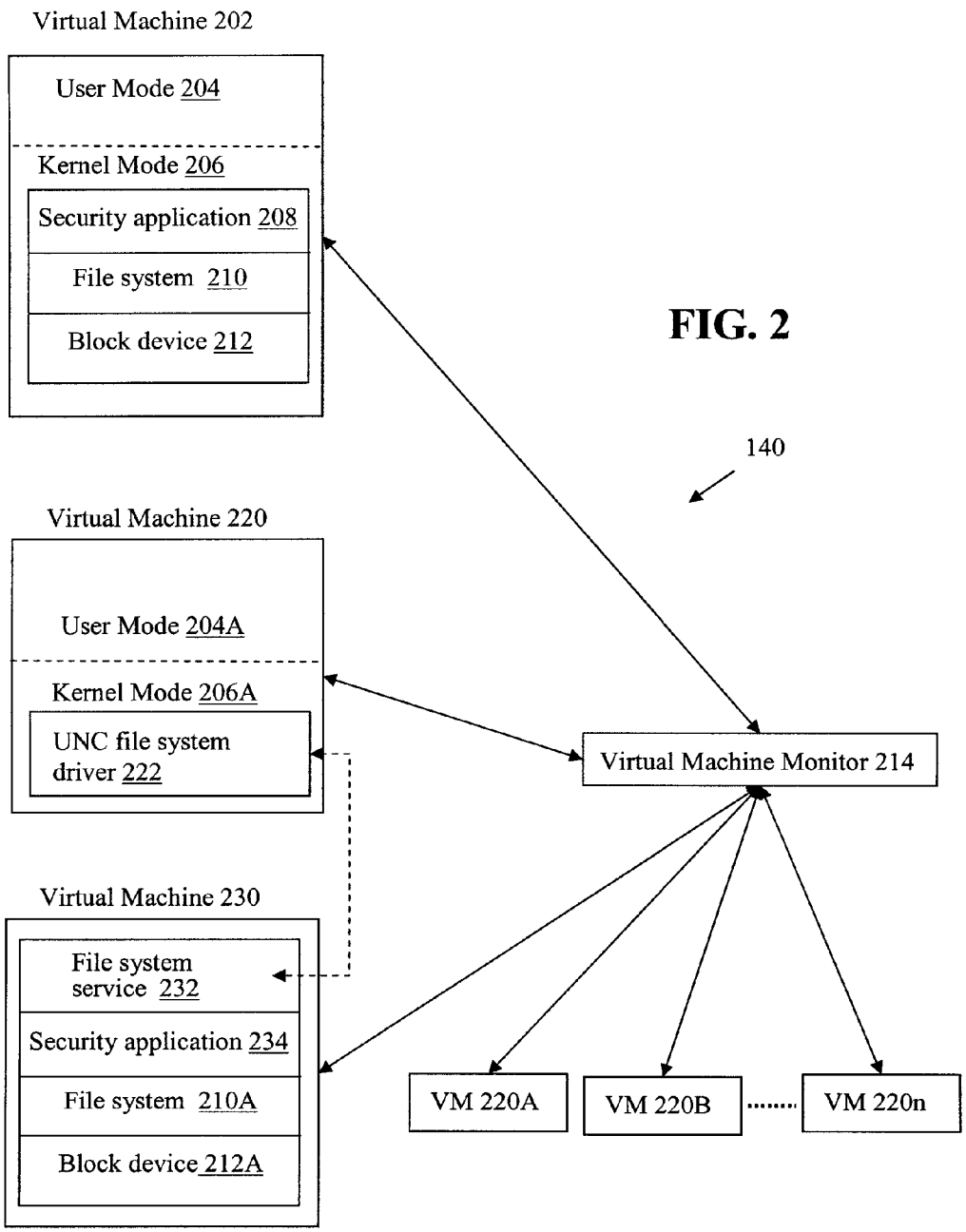
FIG. 2 is a block diagram of a virtual machine architecture of FIG. 1 in accordance with one embodiment.

As an overview, in accordance with one embodiment, referring to FIG. 2, a method includes creating a virtual machine 230 including a remote file system 210A, a file system service 232, and a security application 234. Access to remote file system 210A is restricted with security application 234 upon an unknown malicious code outbreak.

Security application 234 is insinuated at the chokepoint provided by virtual machine 230 to changes to file system 210A. This allows security application 234 to inspect changes to file system 210A, e.g., access of files on file system 210A as well as writing of files to file system 210A, from the shared and controlled environment of virtual machine 230. The protection of file system 210A provided by security application 234 is absolute. Accordingly, security application 234 facilitates a simple, convenient, yet extremely secure solution for restricting access to files and writing of files to file system 210A.

Security application 234 enables reliable and precise protection of file system 210A from an emerging threat during the window between the release of the threat and the delivery of the virus signature for the threat. More particularly, security application 234 restricts access to and writing of files to file system 210A having attributes matching characteristics of the threat. The more that is known about the threat, the more precise are the restrictions placed upon file system 210A thus reducing the impact on users of file system 210A to an absolute minimum.

Figure 1:
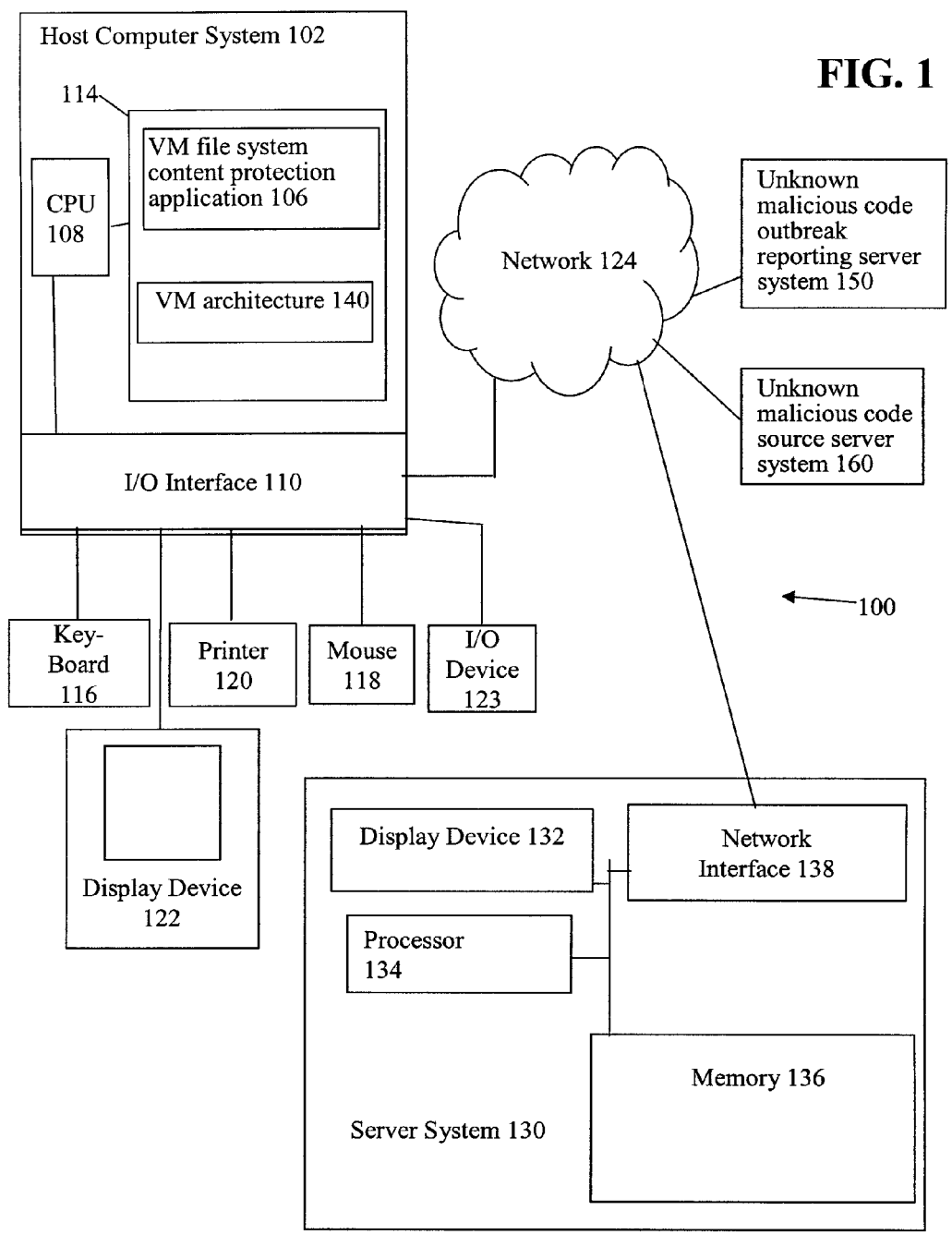
FIG. 1 is a diagram of a client-server system that includes a virtual machine file system content protection application executing on a host computer system in accordance with one embodiment.

Now in more detail, FIG. 1 is a diagram of a client-server system 100 that includes a virtual machine file system content protection application 106 executing on a host computer system 102 in accordance with one embodiment. Host computer system 102, sometimes called a client or user device, typically includes a central processing unit (CPU) 108, hereinafter processor 108, an input output (I/O) interface 110, and a memory 114.

Host computer system 102 may further include standard devices like a keyboard 116, a mouse 118, a printer 120, and a display device 122, as well as, one or more standard input/output (I/O) devices 123, such as a compact disk (CD)

or DVD drive, floppy disk drive, or other digital or waveform port for inputting data to and outputting data from host computer system 102. In one embodiment, virtual machine file system content protection application 106 is loaded into host computer system 102 via I/O device 123, such as from a CD, DVD or floppy disk containing virtual machine file system content protection application 106.

Host computer system 102 is coupled to a server system 130 of client-server system 100 by a network 124. Server system 130 typically includes a display device 132, a processor 134, a memory 136, and a network interface 138. Server system 130 may further include standard devices like a keyboard, a mouse, a printer, and an I/O device(s). The various hardware components of server system 130 are not illustrated to avoid detracting from the principles of this embodiment.

Further, host computer system 102 is also coupled to an unknown malicious code outbreak reporting server system 150 and an unknown malicious code source server system 160 by network 124. In one embodiment, unknown malicious code outbreak reporting server system 150 and unknown malicious code source server system 160 are similar to host computer system 102 and/or server system 130, for example, include a central processing unit, an input output (I/O) interface, and a memory.

Unknown malicious code outbreak reporting server system 150 and unknown malicious code source server system 160 may further include standard devices like a keyboard, a mouse, a printer, a display device and an I/O device(s). The various hardware components of unknown malicious code outbreak reporting server system 150 and unknown malicious code source server system 160 are not illustrated to avoid detracting from the principles of this embodiment.

Network 124 can be any network or network system that is of interest to a user. In various embodiments, network interface 138 and I/O interface 110 include analog modems, digital modems, or a network interface card.

Virtual machine file system content protection application 106 is stored in memory 114 of host computer system 102 and executed on host computer system 102. The particular type of and configuration of host computer system 102, server system 130, unknown malicious code outbreak reporting server system 150, unknown malicious code source server system 160, i.e., real physical computer systems, are not essential to this embodiment.

Further, host computer system 102 includes a virtual machine architecture 140 that includes at least one virtual machine, hereinafter referred to as virtual machines, and a virtual machine monitor that manages the virtual machines as described in greater detail below in reference to FIG. 2.

FIG. 2 is a block diagram of virtual machine architecture 140 of FIG. 1 in accordance with one embodiment. Referring now to FIG. 2, virtual machine architecture 140 includes virtual machines 202, 220, 230 and a virtual machine monitor 214.

Virtual machine (VM) 202, e.g., a system virtual machine, is a software implementation of a computer that executes programs like a real computer and provides a complete system platform which supports the execution of a complete operating system such as a Windows® operating system.

In one embodiment, virtual machine 202 includes a page based virtual memory system that uses pages, sometimes called memory areas. For example, Windows® operating systems provide page-based virtual memory management schemes that permit programs to realize a virtual memory address space. When the computer system processor is running in virtual memory mode, all addresses are assumed to be virtual addresses and are translated, or mapped, to physical addresses in main memory each time the processor executes a new instruction to access memory.

Conventionally, the virtual memory address space is divided into two parts: a lower user address space, also referred to as user mode address space or ring 3, available for use by a program; and, a high system address space, also referred to as kernel address space or ring 0, reserved for use by the operating system.

To protect the integrity of the operating system code and other kernel address space code and data structures from errant or malicious programs and to provide efficient system security (user rights management), Windows® operating systems separate code executing in the user address space, i.e., user mode, from code executing in the kernel address space, i.e., kernel mode. User mode code typically does not have direct access to kernel mode code and has restricted access to computer system resources and hardware.

To utilize kernel mode code functionalities, such as access to disk drives and network connections, user mode programs utilize system calls that interface between the user mode and kernel mode functions.

Accordingly, virtual machine 202 includes a user mode 204 and a kernel mode 206. Kernel mode 206 includes a security application 208, a file system 210, and a block device 212.

Security application 208 provides security for virtual machine 202. Illustratively, security application 208 includes an antivirus scanner for scanning code, e.g., files in file system 210, for malicious code. In one embodiment, malicious code is defined as any computer program, module, set of modules, or code that enters a computer system without an authorized user's knowledge and/or without an authorized user's consent.

File system 210 is a system for storing and organizing computer files and the data they contain to make it easy to find, access and store them. In one embodiment, file system 210 is designed for the storage of files on a data storage device, such as a hard disk drive of host computer system 102. In one embodiment, file system 210 is a New Technology File System (NTFS) file system although other file systems can be used.

File system 210 utilizes block device 212. Block device 212 handles reading and writing of blocks of data, e.g., to the hard disk drive or other storage medium of host computer system 102, as directed by file system 210.

Generally, security application 208 resides between file system 210 and programs on virtual machine 202, e.g., user mode programs in user mode 204 and drivers in kernel mode 206, that access file system 210. In this manner, security application 208 intercepts file system exchanges with file system 210, evaluates the file system exchanges to determine whether they are legitimate or malicious, and takes appropriate action, e.g., allows a valid file system exchange and takes protective action when a file system exchange is malicious.

However, security application 208 is susceptible to deception by malicious code executing on virtual machine 202. More particularly, if the malicious code has the same or greater privileges than security application 208, it is possible for the malicious code to circumvent security application 208 to directly access file system 210.

Virtual machine 202 is similar to a conventional virtual machine and is set forth herein to illustrate how security application 208 within virtual machine 202 can be circumvented by malicious code. Further, a plurality of virtual machines 202 executing simultaneously on host computer system 102 would each require a security application 208 and thus would be overhead intensive. Accordingly, although virtual machine architecture 140 includes virtual machine 202 for the purpose of illustrating a conventional virtual machine structure and the deficiencies thereof, in other embodiments, virtual machine architecture 140 would not include virtual machine 202.

Virtual machine architecture 140 further includes virtual machines 220, 230 in accordance with one embodiment. Virtual machine 220 includes a user mode 204A and a kernel mode 206A in a manner similar to user mode 204 and kernel mode 206 of virtual machine 202 as described above, the discussion of which is herein incorporated by reference. However, in accordance with this embodiment, kernel mode 206A includes a Uniform Naming Convention (UNC) file system driver 222, sometimes called a redirector, the function of which is discussed in detail below.

Virtual machine 230 includes a file system service 232, a security application 234, a file system 210A, and a block device 212A. Security application 234 provides security for virtual machine 230. Illustratively, security application 234 includes an antivirus scanner for scanning code, e.g., files in file system 210A, for known malicious code, or autoprotect function for protecting file system 210A, e.g., rolling back the state of file system 210A. In one embodiment, security application 234 includes a file access/writing restriction module for restricting access to and writing of files to file system 210A during an unknown malicious code outbreak as discussed in greater detail below with reference to FIGS. 6, 7, and 8.

File system 210A, sometimes called a remote file system, is a system for storing and organizing computer files and the data they contain to make it easy to find, access and store them. In one embodiment, file system 210A is designed for the storage of files on a data storage device, such as a hard disk drive of host computer system 102. In one embodiment, file system 210A is a NTFS file system although is another file system in another embodiment.

File system 210A utilizes block device 212A. Block device 212A handles reading and writing of blocks of data, e.g., to the hard disk drive or other storage medium of host computer system 102 as directed by file system 210A.

Virtual machine 230, sometimes called a security partition, is a remote file system for virtual machine 220. More particularly, UNC file system driver 222 and file system service 232 provide a file system interface for remote access of virtual machine 230 from virtual machine 220, e.g., an operating system executing in virtual machine 220, and files of file system 210A of virtual machine 230. Although various actions are described for virtual machines, in light of this disclosure, those of skill in the art will understand that the actions are for operating systems executing on the virtual machines. Illustratively, virtual machine 220 and/or virtual machine 230 is a virtualization of a Windows® based server.

Generally, file system service 232, sometimes called a shim, is a complimentary interface to UNC file system driver 222, i.e., works in conjunction with UNC file system driver 222 to provide a file system interface for remote access of virtual machine 230 from virtual machine 220.

To illustrate, virtual machine monitor 214, sometimes called a virtual machine manager, or VMM, is a virtualization platform that allows multiple virtual machines such as virtual machines 202, 220, 230 to run on host computer system 102 at the same time. Virtual machine monitors similar to virtual machine monitor 214 will be understood by those of skill in the art in light of this disclosure and only the relevant functionality of virtual machine monitor 214 is described herein.

Typically, there is a specific distinction between a virtual machine monitor and a hypervisor. The hypervisor handles only the basic virtualization of the lowest level machine resources, such as the memory management unit (MMU), CPU privilege level states, and dispatching of "Hyper-Calls". In contrast, the virtual machine monitor handles the higher level support of virtual machines such as provisioning the virtual machines, e.g., creating, starting, and stopping the virtual machines, scheduling virtual machine time slices and priorities, virtualizing devices, servicing Hyper-Call requests dispatched by the hypervisor, and so forth. Further, the functions of the hypervisor and virtual machine monitor can be combined into a monolithic hypervisor. Accordingly, although virtual machine monitor 214 is set forth as having specific functions herein, in light of this disclosure, it is to be understood that virtual machine monitor 214 can also support functions of a hypervisor and/or a monolithic hypervisor in other embodiments.

Virtual machine monitor 214 has a higher privilege level than virtual machines 202, 220, 230 allowing virtual machine monitor 214 to manage virtual machines 202, 220, 230. More particularly, any interactions between virtual machines 202, 220, 230 are through, or authorized by, virtual machine monitor 214. The requirement that any interaction between virtual machines 202, 220, 230 occur through, or with permission from, virtual machine monitor 214 is enforced in hardware, e.g., by processor 108, and thus is a very secure requirement.

Virtual machine 220 thus must remotely access file system 210A, e.g., through a Common Internet File System (CIFS) interface or a Network File System (NFS) interface. All file system requests from virtual machine 220 must be funneled through the remote file system interface provided by UNC file system driver 222 and file system service 232.

In one embodiment, the remote file system interface can use shared memory, which is very fast, as the remote file system interface is on a single physical computer 102. In other embodiments, the remote file system interface uses a network interface, a paravirtualizaton/enlightenment technique, and/or a hypercall technique or combinations thereof. In yet another embodiment, hardware can assist or accelerate the transfer of data.

In one embodiment, UNC file system driver 222 uses a common syntax to describe the location of resources, e.g., files, within file system 210A. Illustratively, the UNC syntax used is \\computername\sharedfolder\resource, wherein computername is the name of virtual machine 230, sharedfolder is a folder within file system 210A, and resource is the particular file desired. Although one syntax is set forth, any uniform naming convention to identify resources can be used.

More generally, UNC file system driver 222 packages file system requests from virtual machine 220 to form a packaged file system request according to the communication protocol used. UNC file system driver 222 sends the packaged file system request. The packaged file system request is received by virtual machine monitor 214, which forwards the packaged file system request to virtual machine 230, if allowed.

Upon receipt by virtual machine 230, the packaged file system request is unpackaged by file system service 232. The unpackaged file system request is passed to security application 234, which in turn, passes the unpackaged file system request to file system 210A, if allowed. Alternatively, the unpackaged file system request is passed directly to file system 210A depending upon the particular file system request.

File system 210A returns the file system request result to security application 234, which in turn, passes the file system request result to file system service 232, if allowed. Alternatively, the file system request result is passed directly to file system service 232 depending upon the particular file system request result.

File system service 232 packages the file system request results from virtual machine 230 to form a packaged file system request result according to the communication protocol used. File system service 232 sends the packaged file system request result.

The packaged file system request result is received by virtual machine monitor 214, which returns the packaged file system request result to virtual machine 220, if allowed.

Upon receipt by virtual machine 220, the packaged file system request result is unpackaged by UNC file system driver 222. The unpackaged file system request result is passed to the operating system of virtual machine 220.

Although file system requests and the related replies (results), e.g., file system exchanges, are set forth above as passing through virtual machine monitor 214, in another embodiment, virtual machine monitor 214 authorizes direct communication between virtual machine 220 and 230 as indicated by the dashed connector arrow. Illustratively, the communication is directly between UNC file system driver 222 and file system service 232.

Illustratively, virtual machine 230 is similar to a UNC file server for purposes of how virtual machine 220 interacts with virtual machine 230 in one example.

Generally, security application 234 resides between file system 210A and file system service 232. In this manner, security application 234 intercepts file system exchanges with file system 210A, evaluates the file system exchanges to determine whether they are legitimate or malicious, and takes appropriate action, e.g., allows a valid file system exchange and takes protective action when a file system exchange is malicious.

Further, file system 210A is securely protected from any malicious code executing on virtual machine 220 by the hardware enforced partitioning between virtual machine 220 and virtual machine 230. More particularly, malicious code executing on virtual machine 220 can at best attack, and possibly disable, UNC file system driver 222. However, in this event, the file system interface between virtual machine 220 and virtual machine 230 is disabled. As a result, the malicious code on virtual machine 220 has lost all access to file system 210A, i.e., access to file system 210A is a fail closed model. This is in contrast to malicious code on virtual machine 202, which can gain access to the entire file system 210 should security application 208 be defeated or disabled, as discussed above, which is an example of a fail open model for access to file system 210.

More particularly, security application 234 is insinuated at the chokepoint provided by virtual machine 230 to changes to file system 210A. This allows security application 234 to inspect changes to file system 210A from the shared and controlled environment of virtual machine 230 and remain immune and insulated from the effects of any malicious code, e.g., rootkits, on virtual machine 220.

In one embodiment, file system 210A is mapped directly for virtual machine 220. In another embodiment, a read-only base with copy on write capabilities is provided.

In yet another embodiment, virtual machine 230 provides remote file system 210A for a plurality of virtual machines 220A, 220B, . . . , 220n of virtual machine architecture 140. Each of virtual machines 220A, 220B, . . . , 220n are similar to virtual machine 220 and include a UNC file system driver 222. In this manner, a single security application 234 is provided for a plurality of virtual machines 220, 220A, 220B, . . . , 220n thus minimizing overhead as compared to providing each virtual machine with a security application.

Further, by providing a remote file system 210A for virtual machines 220A, 220B, . . . , 220n, virtual machine 230 provides a single-instance storage capability in one embodiment. A single-instance storage capability is the capability of remote file system 210A to keep one copy of content for virtual machines 220A, 220B, . . . , 220n. This increases efficiency as compared to each virtual machine 220A, 220B, . . . , 220n storing a separate copy of the content.

In one particular embodiment, remote file system 210A is shared by virtual machines 220A, 220B, . . . , 220n with changes stored for each virtual machine 220A, 220B, . . . , 220n. For example, a "test version" of an environment can be booted and all writes go to remote file system 210A and can be sandboxed and later deleted. In another embodiment, virtual machines 220A, 220B, . . . , 220n boot from the same master files in remote file system 210A with changes, such as registry and users settings, being persistently stored and returned as needed.

In yet another embodiment, instead of being within virtual machine 230, security application 234 is within another virtual machine, herein referred to as a security application virtual machine, separate from virtual machines 220, 230. File system requests from virtual machine 220 are routed to the security application virtual machine, and, if allowed, from the security application virtual machine to virtual machine 230 and vice versa. In yet another embodiment, various functionality of virtual machine 230 are incorporated directly into virtual machine monitor 214.

Figure 3:
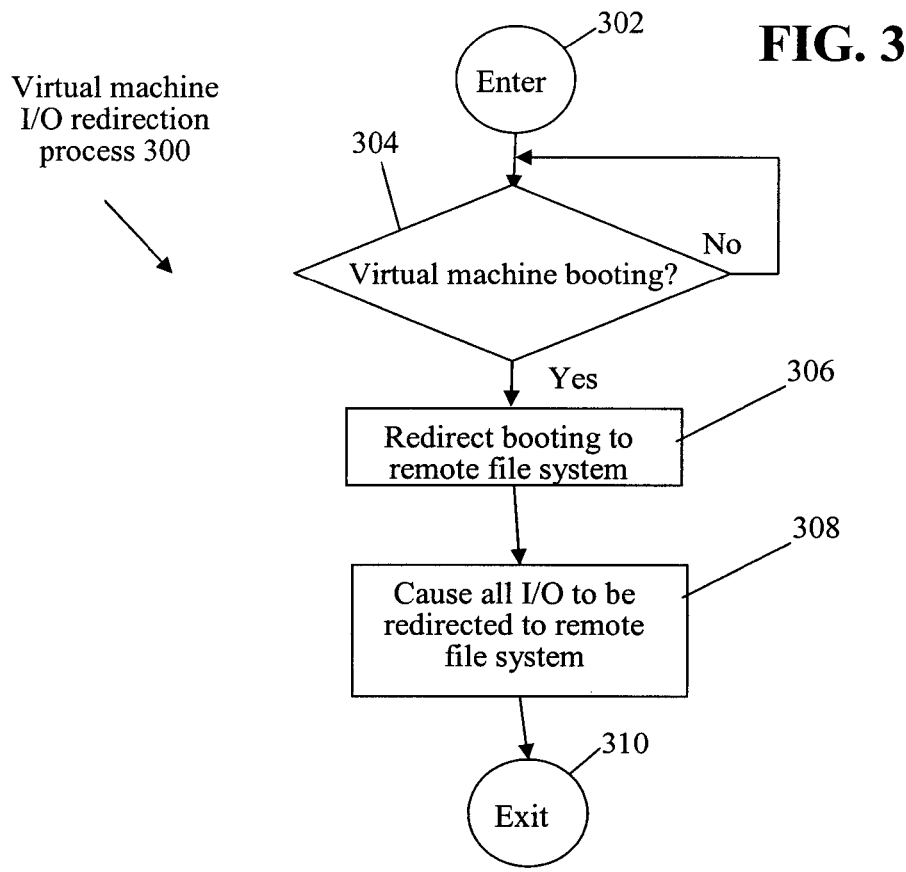
FIG. 3 is a flow diagram of a virtual machine input/output (I/O) redirection process in accordance with one embodiment.

FIG. 3 is a flow diagram of a virtual machine input/output (I/O) redirection process 300 in accordance with one embodiment. Referring now to FIGS. 1, 2 and 3 together, execution of virtual machine file system content protection application 106 by processor 108 results in the operations of virtual machine I/O redirection process 300 as described below in one embodiment.

From an ENTER OPERATION 302, flow moves to a VIRTUAL MACHINE BOOTING CHECK OPERATION 304. In VIRTUAL MACHINE BOOTING CHECK OPERATION 304, a determination is made as to whether a virtual machine is booting. As is well known to those of skill in the art, booting is a bootstrapping process that starts the operating system of the virtual machine when the virtual machine is created.

If a virtual machine is not booting, flow remains a VIRTUAL MACHINE BOOTING CHECK OPERATION 304. Conversely, if a virtual machine is booting, flow moves from VIRTUAL MACHINE BOOTING CHECK OPERATION 304 to a REDIRECT BOOTING TO REMOTE FILE SYSTEM OPERATION 306.

For purposes of illustration, assume the case where virtual machine 220 is booting and virtual machine 230 includes remote file system 210A for virtual machine 220 as described above. In one embodiment, virtual machine 230, sometimes called a first virtual machine, is created prior to booting of any virtual machine that will use remote file system 210A. In another embodiment, upon a determination that virtual machine 220, sometimes called a second virtual machine, is booting, virtual machine 230 is created.

In REDIRECT BOOTING TO REMOTE FILE SYSTEM OPERATION 306, booting of the virtual machine is redirected to the remote file system. In one embodiment, a protocol similar to a network booting protocol is used to redirect the booting to the remote file system. As those of skill in the art will understand in light of this disclosure, network booting is the process of booting a computer from a network rather than a local drive. In accordance with this embodiment, instead of loading the boot block across a network, the boot block is loaded from virtual machine 230.

Illustratively, virtual machine 220 includes a version of Windows® that can boot entirely from a network, such as, for example, network booting versions of Windows® Server or Vista Enterprise. However, instead of booting across a network, booting is redirected to a boot block in virtual machine 230.

In one particular embodiment, an environment similar to a Preboot eXecution Environment (PXE, also known as Pre-Execution Environment or "pixie") is used to boot virtual machine 220 from virtual machine 230. PXE is an environment to boot computers using a network interface independent of the available data storage devices like hard disks, i.e., network booting. See for example, Sobel et al., U.S. patent application Ser. No. 12/059,817, entitled "SIMULATING PXE BOOTING FOR VIRTUALIZED MACHINES", filed on Mar. 31, 2008, which is herein incorporated by reference in its entirety.

Figure 4:
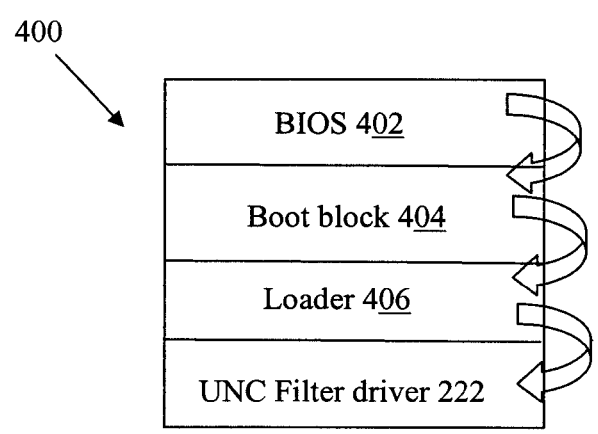
FIG. 4 is a block diagram of a boot sequence used in a REDIRECT BOOTING TO REMOTE FILE SYSTEM OPERATION of the virtual machine I/O redirection process of FIG. 3 in accordance with one embodiment.

FIG. 4 is a block diagram of a boot sequence 400 used in REDIRECT BOOTING TO REMOTE FILE SYSTEM OPERATION 306 of virtual machine I/O redirection process 300 of FIG. 3 in accordance with one embodiment. Referring now to FIGS. 1, 2, 3 and 4 together, boot sequence 400 initially includes loading of a BIOS (Basic Input/Output System) 402 of virtual machine 220. The primary function of BIOS 402 is to identify and initiate, i.e., load and transfer control to, a boot block 404, sometimes called a boot sector. Illustratively, boot block 404 is located within remote file system 210A of virtual machine 230 although could be located within virtual machine monitor 214 or elsewhere.

Boot block 404, e.g., boot files therein, in turn identifies and initiates a loader 406. Loader 406 loads the operating system of the virtual machine 220 including UNC file system driver 222. Accordingly, from REDIRECT BOOTING TO REMOTE FILE SYSTEM OPERATION 306, flow moves to a CAUSE ALL INPUT/OUTPUT (I/O) TO BE REDIRECTED TO REMOTE FILE SYSTEM OPERATION 308 where all input/output of virtual machine 220 is redirected to virtual machine 230 by UNC file system driver 222. From CAUSE ALL I/O TO BE REDIRECTED TO REMOTE FILE SYSTEM OPERATION 308, flow moves to and exits at EXIT OPERATION 310.

In another embodiment, in addition to BIOS 402, one or more of the functions of boot block 404, loader 406 and UNC file system driver 222 can be installed into virtual machine 220 at boot time. However, this involves more modification to the boot sequence of virtual machine 220, which may be undesirable depending upon the particular virtual machine and ability to modify the same.

Figure 5:
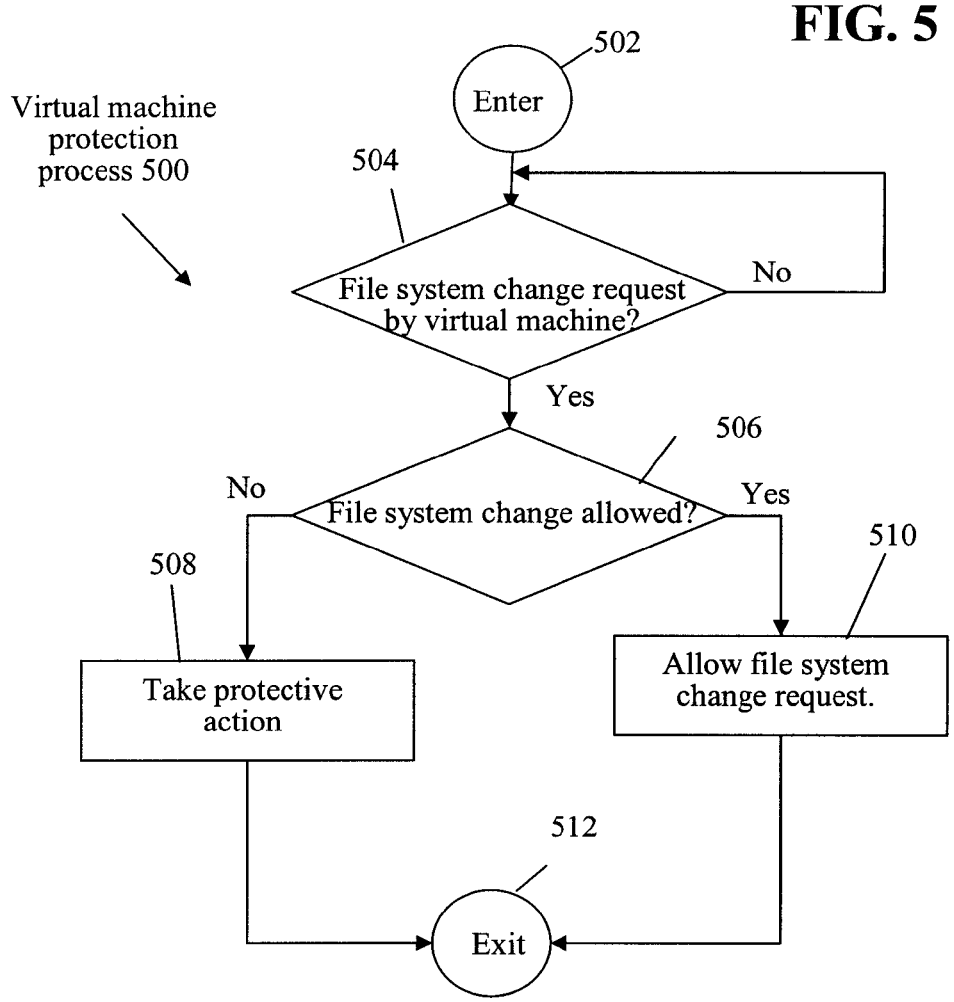
FIG. 5 is a flow diagram of a virtual machine protection process in accordance with one embodiment.

FIG. 5 is a flow diagram of a virtual machine protection process 500 in accordance with one embodiment. Referring now to FIGS. 1, 2 and 5 together, execution of virtual machine file system content protection application 106 by processor 108 results in the operations of virtual machine protection process 500 as described below in one embodiment.

From an ENTER OPERATION 502, flow moves to a FILE SYSTEM CHANGE REQUEST BY VIRTUAL MACHINE CHECK OPERATION 504. In FILE SYSTEM CHANGE REQUEST BY VIRTUAL MACHINE CHECK OPERATION 504, a determination is made as to whether a virtual machine has requested a file system change, i.e., made a file system change request. If a file system change request has not been made, flow remains at FILE SYSTEM CHANGE REQUEST BY VIRTUAL MACHINE CHECK OPERATION 504. Conversely, if a file system change request has been made, flow moves to a FILE SYSTEM CHANGE ALLOWED CHECK OPERATION 506.

Illustratively, virtual machine 220 requests a change of file system 210A on virtual machine 230. This file system change request is intercepted by security application 234.

In FILE SYSTEM CHANGE ALLOWED CHECK OPERATION 506, a determination is made as to whether the requested file system change is allowed or not. If the requested file system change is allowed, i.e., is determined not to be malicious, flow moves from FILE SYSTEM CHANGE ALLOWED CHECK OPERATION 506 to an ALLOW FILE SYSTEM CHANGE REQUEST OPERATION 510. In ALLOW FILE SYSTEM CHANGE REQUEST OPERATION 510, the file system change request is allowed, i.e., passed to file system 210A. From ALLOW FILE SYSTEM CHANGE REQUEST OPERATION 510, flow moves to and exits at an EXIT OPERATION 512 or returns to FILE SYSTEM CHANGE REQUEST BY VIRTUAL MACHINE CHECK OPERATION 504 and awaits the next file system change request.

Conversely, if the requested file system change is not allowed, i.e., is determined to be malicious, flow moves from FILE SYSTEM CHANGE ALLOWED CHECK OPERATION 506 to a TAKE PROTECTIVE ACTION OPERATION 508. In TAKE PROTECTIVE ACTION OPERATION 508, protective action is taken, e.g., the file system change request is not allowed or other protective action taken. In another embodiment, in TAKE PROTECTIVE ACTION OPERATION 508, the file system change is allowed to occur, but the old file system state is saved, allowing reversion back to the old file system state and thus to a known good condition at will.

In one particular example, assume the case where the file system change request is a file write request to write a file to file system 210A. The file is scanned by security application 234 for known malicious code and is determined to be malicious, i.e., to contain known malicious code, in FILE SYSTEM CHANGE ALLOWED CHECK OPERATION 506. Accordingly, the file is not written in TAKE PROTECTIVE ACTION OPERATION 508 preventing the malicious code from being written to file system 210A. In another example, the file is scanned by security application 234 for known malicious code and is determined to be non-malicious, i.e., to not contain known malicious code, in FILE SYSTEM CHANGE ALLOWED CHECK OPERATION 506. Accordingly, the writing of the file to file system 210A is allowed in ALLOW FILE SYSTEM CHANGE REQUEST OPERATION 510.

In another particular example, assume the case where the file system change request is a file access request to access a file on file system 210A. The file is scanned by security application 234 for known malicious code and is determined to be malicious, i.e., to contain known malicious code, in FILE SYSTEM CHANGE ALLOWED CHECK OPERATION 506. Accordingly, access to the file is denied in TAKE PROTECTIVE ACTION OPERATION 508 preventing the malicious code from being propagated from file system 210A to another location, e.g., virtual machine 220. In another example, the file is scanned by security application 234 for known malicious code and is determined to be non-malicious, i.e., to not contain known malicious code, in FILE SYSTEM CHANGE ALLOWED CHECK OPERATION 506. Accordingly, access to the file of file system 210A is allowed in ALLOW FILE SYSTEM CHANGE REQUEST OPERATION 510.

Figure 6:
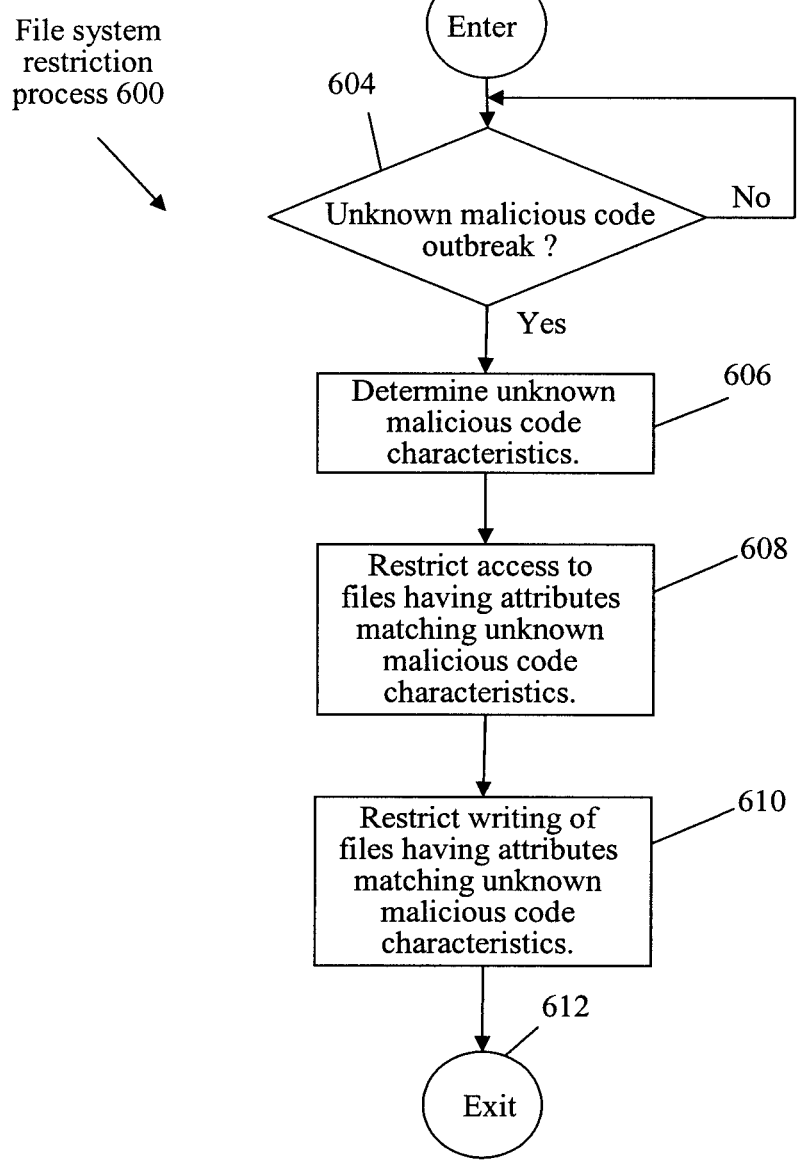
FIG. 6 is a flow diagram of a file system restriction process in accordance with one embodiment.

FIG. 6 is a flow diagram of a file system restriction process 600 in accordance with one embodiment. Referring now to FIGS. 1, 2 and 6 together, execution of virtual machine file system content protection application 106 by processor 108 results in the operations of file system restriction process 600 as described below in one embodiment.

From an ENTER OPERATION 602, flow moves to an UNKNOWN MALICIOUS CODE OUTBREAK CHECK OPERATION 604. In UNKNOWN MALICIOUS CODE OUTBREAK CHECK OPERATION 604, a determination is made as to whether there is an unknown malicious code outbreak, sometimes called a new virus outbreak. In one embodiment, unknown malicious code, sometimes called a threat, is malicious code for which a malicious code signature, sometimes called a virus signature, has not been created. As those of skill in the art will understand in light of this disclosure, a malicious code signature is used by security application 234 to find malicious code patterns inside of files by scanning the files for the malicious code signature. In one specific example, a malicious code signature is a characteristic byte-pattern that is part of certain malicious code. Typically, several malicious code signatures are stored as a virus definition file.

Unfortunately, malicious code must be captured and then analyzed to create the malicious code signature. Thus, there is typically a significant delay between the emergence of new unknown malicious code, i.e., an unknown malicious code outbreak, and the creation of the associated malicious code signature. An outbreak of unknown malicious code is a sudden increase in the number of computer systems infected with the unknown malicious code typically during the early release of the unknown malicious code into the wild.

Once a malicious code signature is created for malicious code, the malicious code is no longer unknown malicious code, but is known malicious code. Accordingly, in UNKNOWN MALICIOUS CODE OUTBREAK CHECK OPERATION 604, a determination is made as to whether there is an outbreak of unknown malicious code for which a malicious code signature has not been created.

If a determination is made that there is not an unknown malicious code outbreak, flow remains at UNKNOWN MALICIOUS CODE OUTBREAK CHECK OPERATION 604. Conversely, upon a determination that there is an unknown malicious code outbreak, flow moves to a DETERMINE UNKNOWN MALICIOUS CODE CHARACTERISTICS OPERATION 606.

In one embodiment, upon an unknown malicious code outbreak, an unknown malicious code outbreak report is issued, e.g., from a security company, a news reporter, or other reputable source. In one particular embodiment, a malicious code outbreak report is issued from unknown malicious code outbreak reporting server system 150 and received by host computer system 102.

In another embodiment, an unknown malicious code outbreak report is issued and an administrator and/or user of host computer system 102 receives the unknown malicious code outbreak report.

The unknown malicious code outbreak report contain actionable descriptions, sometimes called unknown malicious code characteristics, of the fast moving unknown malicious code prior to having a complete description and corresponding malicious code signature for the unknown malicious code (at which point the malicious code would be known malicious code). These actionable descriptions of the unknown malicious code define the unknown malicious code characteristics which are used by security application 234 to protect file system 210A, i.e., to restrict file access/ writing to file system 210A.

Accordingly, upon receipt of an unknown malicious code outbreak report, a determination is made that there is an unknown malicious code outbreak, and flow moves to DETERMINE UNKNOWN MALICIOUS CODE CHARACTERISTICS OPERATION 606. In DETERMINE UNKNOWN MALICIOUS CODE CHARACTERISTICS OPERATION 606, the characteristics, i.e., at least one characteristic, of the unknown malicious code are determined. Generally, a characteristics is distinguishing trait, quality, or property, sometimes called attribute, of the unknown malicious code. A characteristic specifically excludes a malicious code signature, as once a malicious code signature is created the malicious code is no longer unknown malicious code, but known malicious code.

Examples of characteristics include: (1) the outbreak time period, e.g., the date and/or time of emergence of the unknown malicious code; (2) the unknown malicious code file type, e.g., the type of file containing the unknown malicious code; (3) the unknown malicious code source, e.g., the source of the unknown malicious code; (4) the unknown malicious code file name, e.g., the file name of the file containing the unknown malicious code; (5) the unknown malicious code file size, e.g., the file size of the file containing the unknown malicious code.

In one embodiment, the outbreak time period is the time period from the first emergence of the unknown malicious code to the present time. The first emergence of the unknown malicious code is sometimes called the unknown malicious code emergence time and is usually expressed as a date and time.

Any files created or modified prior to the outbreak time period will not contain, or at least are highly unlikely of containing, the unknown malicious code and are deemed un-suspect, i.e., not suspect of containing the unknown malicious code. Conversely, any files created or modified during the outbreak time period may contain the unknown malicious code and may be deemed suspect, i.e., suspect of containing the unknown malicious code.

In one embodiment, the unknown malicious code file type is the type of file containing the unknown malicious code. For example, the unknown malicious code file type is any executable file, e.g., a .EXE file, a .COM file, a browser help object file, or an ActiveX control file. In another example, the unknown malicious code file type is any macro containing file, for example, a non-executable file containing macros. In another example, the unknown malicious code file type is any file, e.g., executable or non-executable, containing malformed content, e.g., content that does not conform to the content expected for the particular type of file. For example, JPEG or TIFF files containing malformed content are examples of unknown malicious code file types in one embodiment.

Any files not having the unknown malicious code file type will not contain, or at least are highly unlikely of containing, the unknown malicious code and are deemed un-suspect, i.e., not suspect of containing the unknown malicious code. Conversely, any files having the unknown malicious code file type may contain the unknown malicious code and may be deemed suspect, i.e., suspect of containing the unknown malicious code.

The unknown malicious code source is the source of the unknown malicious code. In one embodiment, the unknown malicious code source includes the particular Internet sites from which the unknown malicious code is downloaded. For example, if the unknown malicious code is originating from servers located in a particular foreign country, the unknown malicious code source includes servers located in the particular foreign country. In another embodiment, the unknown malicious code source is the Internet regardless of where the computer system from which the file is being downloaded is located. In another embodiment, the unknown malicious code source includes file share servers.

Any files not originating from the unknown malicious code source will not contain, or at least are highly unlikely of containing, the unknown malicious code and are deemed un-suspect, i.e., not suspect of containing the unknown malicious code. Conversely, any files originating from the unknown malicious code source may contain the unknown malicious code and may be deemed suspect, i.e., suspect of containing the unknown malicious code.

The unknown malicious code file name is the file name of the file containing the unknown malicious code. In one embodiment, the unknown malicious code has a unique file name, which is the unknown malicious code file name. In another embodiment, the unknown malicious code file name is similar or identical to a common non-malicious file in an attempt to disguise the unknown malicious code file name.

Any files not having the unknown malicious code file name will not contain, or at least are highly unlikely of containing, the unknown malicious code and are deemed un-suspect, i.e., not suspect of containing the unknown malicious code. Conversely, any files having the unknown malicious code file name may contain the unknown malicious code and may be deemed suspect, i.e., suspect of containing the unknown malicious code.

The unknown malicious code file size is the file size of the file containing the unknown malicious code. Any files not having the unknown malicious code file size, especially those files that are smaller than the unknown malicious code file size, will not contain, or at least are highly unlikely of containing, the unknown malicious code and are deemed un-suspect, i.e., not suspect of containing the unknown malicious code. Conversely, any files having the unknown malicious code file size may contain the unknown malicious code and may be deemed suspect, i.e., suspect of containing the unknown malicious code.

Some examples of characteristics for unknown malicious code are set forth in Nachenberg et al., US Pub. No. 2003/0088680, entitled "TEMPORAL ACCESS CONTROL FOR COMPUTER VIRUS PREVENTION", published on May 8, 2003, which is herein incorporated by reference in its entirety.

In one embodiment, DETERMINE UNKNOWN MALICIOUS CODE CHARACTERISTICS OPERATION 606 is repeatedly performed. For example, as updated malicious code outbreak reports are issued having updated information about the characteristics of the unknown malicious code, the malicious code characteristics are updated.

From DETERMINE UNKNOWN MALICIOUS CODE CHARACTERISTICS OPERATION 606, flow moves to a RESTRICT ACCESS TO FILES HAVING ATTRIBUTES MATCHING UNKNOWN MALICIOUS CODE CHARACTERISTICS OPERATION 608. In RESTRICT ACCESS TO FILES HAVING ATTRIBUTES MATCHING UNKNOWN MALICIOUS CODE CHARACTERISTICS OPERATION 608, access to files having attributes matching the unknown malicious code characteristics is restricted. Recall that the unknown malicious code characteristics were determined in DETERMINE UNKNOWN MALICIOUS CODE CHARACTERISTICS OPERATION 606 as described above.

More particularly, access to files of file system 210A is restricted by security application 234. For example, a malicious file, i.e., a file containing malicious code, is propagated from unknown malicious code source server system 160 and to file system 210A, e.g., during the early stages of the outbreak of the unknown malicious code before the unknown malicious code outbreak report is issued. Based on the matching of the attributes of the malicious file to the unknown malicious code characteristics, access the malicious file is restricted as discussed further below.

Examples of file attributes of a file being accessed include: (1) the file creation or modification date and time, e.g., the date and/or time of creation or modification of the file such as that set forth in a time stamp of the file; (2) the file type; (3) the file name; and (4) the file size.

In one embodiment, access to files that were created or modified during the outbreak time period is restricted. In another embodiment, access to files that are of the unknown malicious code file type is restricted. In another embodiment, access to files having the unknown malicious code file name is restricted. In yet another embodiment, access to files having the unknown malicious code file size is restricted.

Although access to various files is described as being restricted based on the file having a single attribute matching a single malicious code characteristic, in other embodiments, access is restricted based upon more than one attribute matching more than one characteristic. In one embodiment, configurable rules are created for defining the required correspondence between one or more of the file attributes and one or more of the unknown malicious code characteristics to result in a conclusion that a match has occurred.

For example, the unknown malicious code file type is that the file must be executable and the unknown malicious code file size specifies that the file must have a size equal to or greater than a predefined size. In accordance with this example, access to executable files having a file size equal to or greater than the predefined size is restricted. However, access to a non-executable file or a file smaller than the predefined size is not restricted.

From RESTRICT ACCESS TO FILES HAVING ATTRIBUTES MATCHING UNKNOWN MALICIOUS CODE CHARACTERISTICS OPERATION 608, flow moves to a RESTRICT WRITING OF FILES HAVING ATTRIBUTES MATCHING UNKNOWN MALICIOUS CODE CHARACTERISTICS OPERATION 610. In RESTRICT WRITING OF FILES HAVING ATTRIBUTES MATCHING UNKNOWN MALICIOUS CODE CHARACTERISTICS OPERATION 610, writing of files having attributes matching the unknown malicious code characteristics is restricted. Recall that the unknown malicious code characteristics were determined in DETERMINE UNKNOWN MALICIOUS CODE CHARACTERISTICS OPERATION 606 as described above.

More particularly, writing of files to file system 210A is restricted by security application 234. For example, a malicious file, i.e., a file containing malicious code, is being downloaded from unknown malicious code source server system 160 and to file system 210A, e.g., at a later stage of the outbreak of the unknown malicious code and after the unknown malicious code outbreak report is issued. Based on the matching of the attributes of the malicious file to the unknown malicious code characteristics, writing of the malicious file is restricted as discussed further below.

Examples of file attributes of a file being written include: (1) the file creation or modification date and time, e.g., the date and/or time of creation or modification of the file such as that set forth in a time stamp of the file; (2) the file type; (3) the file source, e.g., the source from which the file is being downloaded or written from; (4) the file name; and (5) the file size.

In one embodiment, writing of any files or files that were created or modified during the outbreak time period is restricted. In another embodiment, writing of files that are of the unknown malicious code file type is restricted. In another embodiment, writing of files from the unknown malicious code source is restricted. In another embodiment, writing of files having the unknown malicious code file name is restricted. In yet another embodiment, writing of files having the unknown malicious code file size is restricted.

Although writing of various files is described as being restricted based on the file having a single attribute matching a single malicious code characteristic, in other embodiments, writing is restricted based upon the file having more than one attribute matching more than one characteristic. In one embodiment, configurable rules are created for defining the required correspondence between one or more of the file attributes and one or more of the unknown malicious code characteristics to result in a conclusion that a match has occurred.

For example, the unknown malicious code file type is that the file must be executable and the unknown malicious code file size specifies that the file must have a size equal to greater than a predefined size. In accordance with this example, writing of executable files having a file size equal to or greater than the predefined size is restricted. However, writing of a non-executable file or a file smaller than the predefined size is not restricted.

From RESTRICT WRITING OF FILES HAVING ATTRIBUTES MATCHING UNKNOWN MALICIOUS CODE CHARACTERISTICS OPERATION 610, flow moves to and exits at an EXIT OPERATION 612 or returns to UNKNOWN MALICIOUS CODE OUTBREAK CHECK OPERATION 604 and awaits the next unknown malicious code outbreak.

In one embodiment, upon receipt of an unknown malicious code outbreak report, virtual machine file system content protection application 106 automatically restricts access to files and writing of files having attributes matching the unknown malicious code characteristics as set forth above in OPERATIONS 608, 610. In another embodiment, an administrator and/or user of host computer system 102 receives the unknown malicious code outbreak report. The administrator and/or user of host computer system 102 manually restricts access to file and writing of files having attributes matching the unknown malicious code characteristics as set forth above in OPERATIONS 608, 610.

Figure 7:
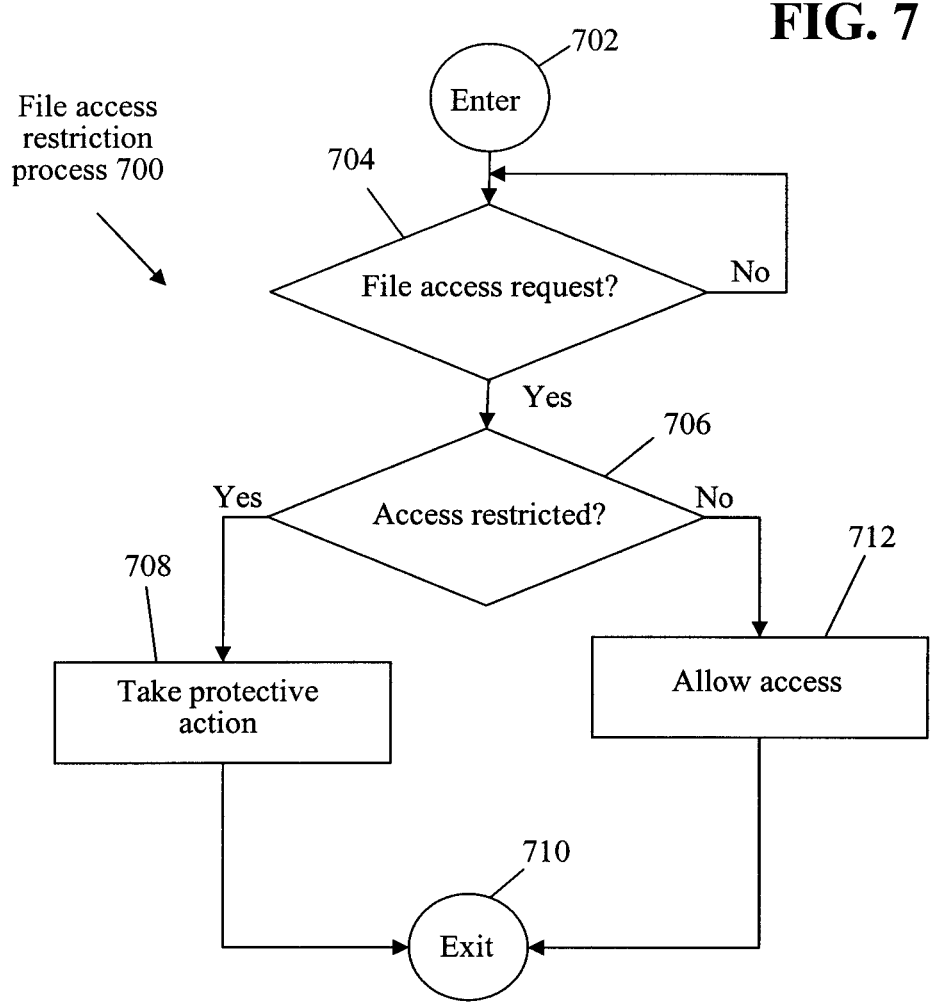
FIG. 7 is a file access restriction process in accordance with one embodiment.

FIG. 7 is a file access restriction process 700 in accordance with one embodiment. Referring now to FIGS. 1, 2, 6 and 7 together, execution of virtual machine file system content protection application 106 by processor 108 results in the operations of file access restriction process 700 as described below in one embodiment.

From an ENTER OPERATION 702, flow moves to a FILE ACCESS REQUEST CHECK OPERATION 704. In FILE ACCESS REQUEST CHECK OPERATION 704, a determination is made as to whether there has been a request to access a file. If there has not been a file access request, flow remains at FILE ACCESS REQUEST CHECK OPERATION 704. Conversely, upon a file access request, flow moves from FILE ACCESS REQUEST CHECK OPERATION 704 to an ACCESS RESTRICTED CHECK OPERATION 706. Generally, a file access request is referred to as a file system change request.

As described above, all file access requests, i.e., requests for access to files of file system 210A, are routed through security application 234. For example, a file access request from virtual machine 220 for a file of file system 210A is received by security application 234. Accordingly, upon receiving a file access request by security application 234, a determination is made that there has been a file access request and flow moves to ACCESS RESTRICTED CHECK OPERATION 706.

In ACCESS RESTRICTED CHECK OPERATION 706, a determination is made as to whether access to the requested file is restricted. Recall that access to files was restricted in RESTRICT ACCESS TO FILES HAVING ATTRIBUTES MATCHING UNKNOWN MALICIOUS CODE CHARACTERISTICS OPERATION 608 as described above. Generally, the file attributes of the requested file are determined. Based upon a comparison of the file attributes with the unknown malicious code characteristics, a determination is made as to whether access to the requested file is restricted as discussed above in reference to FIG. 6.

If there is a match between the file attributes and the unknown malicious code characteristics, a determination is made that access to the requested file is restricted. Conversely, if there is not a match, sometimes called a mismatch, between the file attributes and the unknown malicious code characteristics, a determination is made that access to the requested file is not restricted.

If a determination is made that access is restricted in ACCESS RESTRICTED CHECK OPERATION 706, flow moves to a TAKE PROTECTIVE ACTION OPERATION 708. In TAKE PROTECTIVE ACTION OPERATION 708, protective action is taken with regards to the file access request. In one embodiment, access to the requested file is denied.

In another embodiment, the requested file is made safe, and access to the requested file is granted. For example, macro sections of the requested file are locked or otherwise made non-accessible and access is then granted to the requested file. Generally, access is granted to the requested file in a safe manner, e.g., access to the requested file in any manner that is dangerous is denied.

In another embodiment, the requested file is quarantined. Once the malicious code signature for the unknown malicious code is later obtained (at which point the unknown malicious code becomes known malicious code), the file is scanned using an antivirus scanner, e.g., of security application 234, to determine if the file is malicious or not. If the file is determined to be non-malicious, access to the file is granted in one embodiment.

In another embodiment, access to an earlier version of the file that is known to be non-malicious is granted instead of access to the file that may contain malicious code. For example, an attribute of the requested file indicates that the file was created during the malicious code outbreak period, i.e., an unknown malicious code characteristic. Accordingly, in TAKE PROTECTIVE ACTION OPERATION 708, access to the file is denied. However, existing within file system 210A is an earlier version of the requested file that was created prior to the malicious code outbreak period. As this earlier version was created prior to the malicious code outbreak period, this earlier version is presumed unsuspicious of containing the unknown malicious code. Accordingly, access to this earlier version of the file is granted.

From TAKE PROTECTIVE ACTION OPERATION 708, flow moves to and exits at an EXIT OPERATION 710 or returns to FILE ACCESS REQUEST CHECK OPERATION 704 and awaits the next file access request.

Returning again to ACCESS RESTRICTED CHECK OPERATION 706, upon a determination that access to the requested file is not restricted, flow moves to an ALLOW ACCESS OPERATION 712. In ALLOW ACCESS OPERATION 712, access to the requested file is allowed, sometimes called granted.

In accordance with this embodiment, the requested file does not have attributes matching the malicious code characteristics and thus is not suspected of containing the unknown malicious code. Accordingly, access is allowed to the requested file. From ALLOW ACCESS OPERATION 712, flow moves to and exits at EXIT OPERATION 710 or returns to FILE ACCESS REQUEST CHECK OPERATION 704 and awaits the next file access request.

Figure 8:
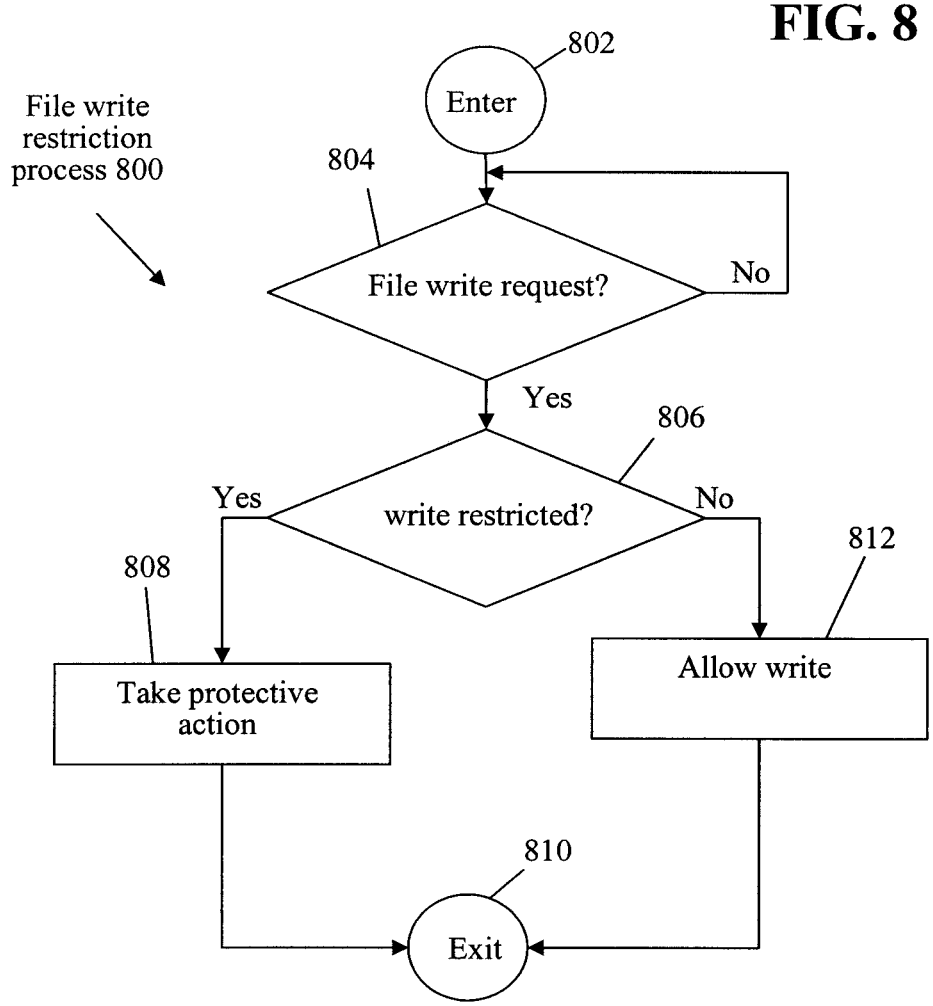
FIG. 8 is a file write restriction process in accordance with one embodiment.

FIG. 8 is a file write restriction process 800 in accordance with one embodiment. Referring now to FIGS. 1, 2, 6 and 8 together, execution of virtual machine file system content protection application 106 by processor 108 results in the operations of file write restriction process 800 as described below in one embodiment.

From an ENTER OPERATION 802, flow moves to a FILE WRITE REQUEST CHECK OPERATION 804. In FILE WRITE REQUEST CHECK OPERATION 804, a determination is made as to whether there has been a request to write a file. If there has not been a file write request, flow remains at FILE WRITE REQUEST CHECK OPERATION 804. Conversely, upon a file write request, flow moves from FILE WRITE REQUEST CHECK OPERATION 804 to a WRITE RESTRICTED CHECK OPERATION 806. Generally, a file write request is referred to as a file system change request.

As described above, all file write requests, i.e., requests for writing of files to file system 210A, are routed through security application 234. For example, a file write request from virtual machine 220 to write a file to file system 210A is received by security application 234. Accordingly, upon receiving a file write request by security application 234, a determination is made that there has been a file write request and flow moves to WRITE RESTRICTED CHECK OPERATION 806.

In WRITE RESTRICTED CHECK OPERATION 806, a determination is made as to whether writing of the requested file is restricted. Recall that writing of files was restricted in RESTRICT WRITING OF FILES HAVING ATTRIBUTES MATCHING UNKNOWN MALICIOUS CODE CHARACTERISTICS OPERATION 610 as described above. Generally, the file attributes of the file being written are determined. Based upon a comparison of the file attributes with the unknown malicious code characteristics, a determination is made as to whether writing of the file is restricted as discussed above in reference to FIG. 6.

If there is a match between the file attributes and the unknown malicious code characteristics, a determination is made that writing of the file is restricted. Conversely, if there is not a match, sometimes called a mismatch, between the file attributes and the unknown malicious code characteristics, a determination is made that writing of the file is not restricted.

If a determination is made that writing is restricted in WRITE RESTRICTED CHECK OPERATION 806, flow moves to a TAKE PROTECTIVE ACTION OPERATION 808. In TAKE PROTECTIVE ACTION OPERATION 808, protective action is taken with regards to the file write request. In one embodiment, writing of the requested file is denied.

In another embodiment, the file is made safe, and writing of the file is granted. For example, macro sections of the file are locked or otherwise made non-accessible and writing of the file is then granted. Generally, writing of the file is granted in a safe manner, e.g., writing of the file in any manner that is dangerous is denied.

In another embodiment, the requested file is written to a secure storage area and quarantined. Once the malicious code signature for the unknown malicious code is later obtained (at which point the unknown malicious code becomes known malicious code), the file is scanned using an antivirus scanner, e.g., of security application 234, to determine if the file is malicious or not. If the file is determined to be non-malicious, the file is copied from quarantine to the target location of file system 210A in one embodiment.

From TAKE PROTECTIVE ACTION OPERATION 808, flow moves to and exits at an EXIT OPERATION 810 or returns to FILE WRITE REQUEST CHECK OPERATION 804 and awaits the next file write request.

Returning again to WRITE RESTRICTED CHECK OPERATION 806, upon a determination that writing of the requested file is not restricted, flow moves to an ALLOW WRITE OPERATION 812. In ALLOW WRITE OPERATION 812, writing of the requested file is allowed, sometimes called granted.

In accordance with this embodiment, the requested file does not have attributes matching the malicious code characteristics and thus is not suspected of containing the unknown malicious code. Accordingly, writing of the requested file is allowed. From ALLOW WRITE OPERATION 812, flow moves to and exits at EXIT OPERATION 810 or returns to FILE WRITE REQUEST CHECK OPERATION 804 and awaits the next file write request.

As described above, security application 234 is insinuated at the chokepoint provided by virtual machine 230 to changes to file system 210A. This allows security application 234 to inspect changes to file system 210A, e.g., access of files on file system 210A as well as writing of files to file system 210A, from the shared and controlled environment of virtual machine 230. The protection of file system 210A provided by security application 234 is absolute. Accordingly, security application 234 facilitates a simple, convenient, yet extremely secure solution for restricting access to files and writing of files to file system 210A.

Security application 234 enables reliable and precise protection of file system 210A from an emerging threat during the window between the release of the threat and the delivery of the virus signature for the threat. More particularly, security application 234 restricts access to and writing of files to file system 210A having attributes matching characteristics of the threat. The more that is known about the threat, the more precise are the restrictions placed upon file system 210A thus reducing the impact on users of file system 210A to an absolute minimum.

Referring again to FIG. 1, virtual machine file system content protection application 106 is in computer memory 114. As used herein, a computer memory refers to a volatile memory, a non-volatile memory, or a combination of the two.

Although virtual machine file system content protection application 106 is referred to as an application, this is illustrative only. Virtual machine file system content protection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a tangible storage medium configured to store or transport computer readable code in accordance with an embodiment. Some examples of computer program products are CD-ROM discs, DVDs, ROM cards, floppy discs, magnetic tapes, computer hard drives, and servers on a network.

As illustrated in FIG. 1, this medium may belong to the computer system itself. However, the medium also may be removed from the computer system. For example, virtual machine file system content protection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the virtual machine file system content protection functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the virtual machine file system content protection functionality in accordance with one embodiment can be implemented in a wide variety of computer system configurations. In addition, the virtual machine file system content protection functionality could be stored as different modules in memories of different devices.

For example, virtual machine file system content protection application 106 could initially be stored in server system 130, and then as necessary, a portion of virtual machine file system content protection application 106 could be transferred to host computer system 102 and executed on host computer system 102. Consequently, part of the virtual machine file system content protection functionality would be executed on processor 134 of server system 130, and another part would be executed on processor 108 of host computer system 102. In view of this disclosure, those of skill in the art can implement various embodiments in a wide-variety of physical hardware configurations using an operating system and computer programming language of interest to the user.

In yet another embodiment, virtual machine file system content protection application 106 is stored in memory 136 of server system 130. Virtual machine file system content protection application 106 is transferred over network 124 to memory 114 in host computer system 102. In this embodiment, network interface 138 and I/O interface 110 would include analog modems, digital modems, or a network interface card. If modems are used, network 124 includes a communications network, and virtual machine file system content protection application 106 is downloaded via the communications network.

This application is related to Sobel et al., U.S. patent application Ser. No. 12/059,622, entitled "virtual machine file system content protection system and method", filed on Mar. 31, 2008, which is herein incorporated by reference in its entirety.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
   executing a host operating system on a host computing system;
   creating a first virtual machine within the host operating system, the first virtual machine comprising:
     a remote file system;
     a file system service; and
     a security application between said remote file system and said file system service;
   creating a second virtual machine within the host operating system of the host computing system, the second virtual machine comprising a Uniform Naming Convention (UNC) file system driver of the second virtual machine configured to cause all input/output operations processed in a kernel mode from said second virtual machine to be redirected to said remote file system of the first virtual machine via the security application of the first virtual machine, wherein the input/output operations are processed in a user mode in said remote file system;
   booting said second virtual machine, wherein said booting said second virtual machine comprises loading a boot block from said first virtual machine and redirecting booting of said second virtual machine to said remote file system;
   determining, upon an outbreak of unknown malicious code, at least one unknown malicious code characteristic, wherein the unknown malicious code characteristic comprises at least one file attribute comprising at least one of an outbreak time period, a file type, a source, a file name, and a file size; and
   restricting, by the security application of the first virtual machine, access of said second virtual machine to said remote file system, wherein the restricting is performed based on the determined unknown malicious code characteristic, wherein the restricting is further performed based on configured rules relating the at least one file attribute and the unknown malicious code characteristic.

2. The computer-implemented method of claim 1 further comprising:
   determining whether there has been a request to access a file of said remote file system from said second virtual machine, wherein upon a determination that there has been said request to access said file; and comparing file attributes of said file to unknown malicious code characteristics of said unknown malicious code, wherein upon a match between said file attributes and said unknown malicious code characteristics, said method further comprising taking protective action.

3. The computer-implemented method of claim 1 further comprising:

determining whether there has been a request to access a file of said remote file system from said second virtual machine, wherein upon a determination that there has been said request to access said file; and comparing file attributes of said file to unknown malicious code characteristics of said unknown malicious code, wherein upon a mismatch between said file attributes and said unknown malicious code characteristics, said method further comprising allowing said access to said file.

4. The computer-implemented method of claim 1 further comprising:

determining whether there has been a request to write a file to said remote file system from said second virtual machine, wherein upon a determination that there has been said request to write said file; and comparing file attributes of said file to unknown malicious code characteristics of said unknown malicious code, wherein upon a match between said file attributes and said unknown malicious code characteristics, said method further comprising taking protective action.

5. The computer-implemented method of claim 1 further comprising:

determining whether there has been a request to write a file to said remote file system from said second virtual machine, wherein upon a determination that there has been said request to write said file; and comparing file attributes of said file to unknown malicious code characteristics of said unknown malicious code, wherein upon a mismatch between said file attributes and said unknown malicious code characteristics, said method further comprising allowing said writing of said file.

6. A computer-program product comprising a nontransitory computer readable storage medium containing computer program code which when executed by one or more computing processors performs a process comprising:

executing a host operating system on a host computing system;

creating a first virtual machine within the host operating system, the first virtual machine comprising:
 a remote file system;
 a file system service; and
 a security application between said remote file system and said file system service;

creating a second virtual machine within the host operating system of the host computing system, the second virtual machine comprising a Uniform Naming Convention (UNC) file system driver of the second virtual machine configured to cause all input/output operations processed in a kernel mode from said second virtual machine to be redirected to said remote file system of the first virtual machine via the security application of the first virtual machine, wherein the input/output operations are processed in a user mode in said remote file system;

booting said second virtual machine, wherein said booting said second virtual machine comprises loading a boot block from said first virtual machine and redirecting booting of said second virtual machine to said remote file system;

determining, upon an outbreak of unknown malicious code, at least one unknown malicious code characteristic, wherein the unknown malicious code characteristic comprises at least one file attribute comprising at least one of an outbreak time period, a file type, a source, a file name, and a file size; and restricting, by the security application of the first virtual machine, access of said second virtual machine to said remote file system, wherein the restricting is performed based on the determined unknown malicious code characteristic, wherein the restricting is further performed based on configured rules relating the at least one file attribute and the unknown malicious code characteristic.

\* \* \* \* \*